(12) United States Patent
Gonthier et al.

(10) Patent No.: US 6,760,495 B2
(45) Date of Patent: Jul. 6, 2004

(54) ALL-FIBER DEPOLARIZER

(75) Inventors: François Gonthier, Ville Mont-Royal (CA); Bruno Y. Dion, Vaudreuil-Dorion (CA); Nicolas Godbout, Montreal (CA); Alain Villeneuve, St-Laurent (CA)

(73) Assignees: ITF Technologies Optiques Inc.; ITF Optical Technologies Inc., Ville St-Laurent (CA)

( * ) Notice: Subject to any disclaimer, the term of this patent is extended or adjusted under 35 U.S.C. 154(b) by 157 days.

(21) Appl. No.: 10/045,190

(22) Filed: Jan. 15, 2002

(65) Prior Publication Data

US 2003/0063833 A1 Apr. 3, 2003

(30) Foreign Application Priority Data

Sep. 28, 2001  (CA) .............................................. 2357955

(51) Int. Cl.[7] .............................. G02B 6/00; G02B 6/27; G02B 6/255
(52) U.S. Cl. .............................. 385/11; 385/32; 385/43; 385/97
(58) Field of Search ........................ 385/11, 27, 30–32, 385/39, 43, 95–98

(56) References Cited

U.S. PATENT DOCUMENTS

| | | | | |
|---|---|---|---|---|
| 4,906,068 A | * | 3/1990 | Olson | 385/43 |
| 5,218,652 A | * | 6/1993 | Lutz | 385/11 |
| 5,293,264 A | | 3/1994 | van Deventer | 359/192 |
| 5,457,756 A | | 10/1995 | Hartl et al. | 385/11 |
| 5,486,916 A | | 1/1996 | Michal et al. | 356/345 |
| 5,881,185 A | | 3/1999 | Feth et al. | 385/11 |
| 5,933,555 A | * | 8/1999 | Shen | 385/32 |
| 6,205,262 B1 | | 3/2001 | Shen | 385/11 |

FOREIGN PATENT DOCUMENTS

| | | | |
|---|---|---|---|
| CA | 2354903 | 2/2003 | |
| JP | 6-751243 | 2/1994 | ........... G02B/27/28 |

* cited by examiner

Primary Examiner—Hemang Sanghavi
Assistant Examiner—Omar Rojas
(74) Attorney, Agent, or Firm—George J. Primak (57) ABSTRACT

An all-fiber optical depolarizer is provided in which polarized light is controllably injected into a polarization beam splitter at a 45° angle. The beam splitter is combined with a loop made of standard non-birefringent fiber through which one of the polarizations split by the beam splitter circulates. The loop has a length greater than the coherence length of the light source. The interaction of the beam splitter and the loop produces incoherent depolarized light at the output transmission port of the beam splitter.

13 Claims, 9 Drawing Sheets

ALL-FIBER DEPOLARIZER

FIELD OF THE INVENTION

This invention relates to optical fibers and optical fiber components. It relates in particular to an all-fiber depolarizer enabling the change of an optical signal polarization state, from a strongly polarized state to an unpolarized or depolarized state.

BACKGROUND OF THE INVENTION

Laser light transmitted through optical fibers is usually a polarized light because lasers and laser diodes are strongly polarized light sources. There are however some applications where the polarization of the light is not desirable. In test systems, the results are not influenced by polarization dependent loss (PDL) if the light source is unpolarized. In Raman amplification systems, the Raman effect is polarization dependent, thus the need for an unpolarized source for higher uniformity performance.

There are only a few truly unpolarized light sources available. An incandescent lamp or an arc lamp will produce unpolarized light, i.e. light that contains all states of polarization at the same time. However, these sources are big, produce a lot of heat and thus have low energy efficiencies. It is very inefficient to couple them to single-mode optical fibers. To build a bulk laser that is unpolarized, one can build a laser cavity that has no polarization-dependent element. This is possible with a gas laser that has dielectric mirrors which are not placed at angles with the axis of the cavity. Though these lasers can be coupled relatively efficiently to optical fibers through lenses, they are also bulky and not very energy efficient. To obtain higher power efficiency, one must use a semiconductor diode laser, either as a pump for fiber lasers or as the laser source itself Because of their structure, laser diodes are highly polarized light sources. Only a vertical cavity diode can be unpolarized, but it can not have a high power emission because of the extreme size length of the laser cavity. Thus such laser diodes cannot be used as pump lasers in Raman amplifiers.

With a non-birefringent rare-earth doped fiber, such as erbium doped fiber, one can build unpolarized light sources, such as a broadband amplified spectral emission (ASE) source or even a fiber laser, because they are made with non-polarization selective elements such as broadband WDM fused fiber couplers. These sources are powerful and easy to couple with fibers, but are much bulkier than semiconductor diode lasers. There is thus an interest to depolarize sources such as semiconductor diode lasers.

The purpose of the depolarizer is to transform the output of a polarized source, which has a high degree of polarization (DOP), typically close to 99%, and to reduce that degree of polarization to a very small value, typically a few percent. One cannot truly depolarize a polarized light source, but one can simulate an unpolarized source by shifting the state-of-polarization so fast that the system or the detector averages all the states of polarization. This can be done in time and/or in wavelength. To realize a depolarizer strictly in time, one can actively modulate the polarization. This is usually done with piezoelectric elements that modulate lengths of a birefringent fiber, thus rotating the state of polarization as fast as the piezoelectric element can be modulated. This method works, but does not insure that all-states of polarization are always on average passed through. It will depend on the speed of the detector or the system. This is also an active device, which is useful in test systems, for example because it is more or less universal. In systems or subsystems however, such as Raman amplifiers, one prefers a passive depolarizer rather than an active one.

Passive depolarizers have been produced using fiber delay lines. The basic principle is to mix different states of polarization, delayed in time, through a fiber loop or fiber lengths. The principle behind passive depolarizers makes them sensitive to the bandwidth of the laser. A very broad source (tens of nanometers) is easy to depolarize, whereas very narrow band lasers, such as a single-mode laser, are almost impossible to depolarize completely because their coherence lengths are very long.

U.S. Pat. Nos. 5,933,555 and 6,205,262 describe a depolarizer based on recirculating loops. To achieve a depolarized state, a polarized light source is split through a 2×2 (2 inputs, 2 outputs) splitter, with a given amount of power being split in the recirculating loop. The rest of the power goes to the transmission fiber. The splitter's optical function is to split light from either of the input ports of the splitter to the two output ports, at a given ratio, i.e., 50%/50%, 33%/67%, etc. This split light goes through the loop back to the second input port of the splitter and thus is partly recombined in the initial transmission fiber. Because there is no control over the polarization in the loop, the amount recombined is in a random orientation with the initial input light. The rest goes back into the loop and again is recombined at a random state, etc. until the amount recombined is negligible. Though this principle does depolarize the light, it only performs a partial depolarization. The depolarization efficiency will depend on the coupling ratio and the polarization changes in the loop. To obtain a relatively uniform depolarization as a function of polarization input states and wavelength, one must use a broadband splitter and cascade many such recirculating loop depolarizers so that if the first loop reduces the degree of polarization to 40%, the second will reduce it to $(0.4)^2=16\%$. To obtain a very low DOP up to 15 such stages are required. One can make the device a bit more efficient by placing a polarization controller between the loops and either use birefringent fiber or place a further polarization controller in the loop, but this still produces a very bulky arrangement to obtain desired depolarization effects. Fewer loops are required to depolarize a broadband source than a narrower band source. Furthermore, if one wishes to depolarize without controlling the input polarization, theoretically one can never obtain a completely depolarized light. One can only hope that one will tend towards complete depolarization if one adds a great number of stages. The only advantage of this device is that it can be made with a low cost fused non-polarization maintaining couplers, but it requires several couplers, splices and a lot of optical fibers for all the different loops and thus is very bulky and lossy.

A more efficient recirculating loop is presented in U.S. Pat. No. 5,218,652 where control of the states of polarization is provided. Because the states of polarization are controlled, a single recirculating loop is required, reducing the amount of fiber and components. The principle is, however, the same as the recirculating loops discussed in U.S. Pat. No. 5,933, 555. Part of the light is recombined with a delay and in a different state of polarization than the input light. In U.S. Pat. No. 5,218,652, the idea is to use a polarization preserving coupler to split the light and a birefringent fiber to preserve the polarization in the recirculating loop. It is stated that the best configuration for this device is to split the light with one part in the transmission and two parts in the loop and to recombine in the coupler at a 90° angle, in essence rotating the polarization maintaining (PM) fiber by 90° before splicing it to the second input of the coupler. In principle, one can achieve complete depolarization in this manner, if there is no optical loss in the coupler and the fiber loop, but in practice because the coupling ratio of the coupler depends on wavelength, the loop is lossy due to the length of the birefringent fiber and the precise control of the splice angle required in the loop. Because of such losses, the optical signal cannot infinitely loop back. However, because this configuration requires a single loop of polarization maintaining PM fiber, it is ultimately less lossy and bulky than the previously discussed design, but it still has the same kind of efficiency problem.

A way to address this problem is to use the loop as a delay line rather than a recirculating loop. This is present in Japanese Patent No. JP6051243 and U.S. Pat. No. 5,293,264. In both patents, a polarization beam splitter is used to separate the polarization in two parts and then recombine them at 90° after looping the second part in a birefringent fiber which is reconnected at 90° to the second input of the polarization splitter. Because the polarization splitter is used as a polarization combiner, the signal travels only once in the loop and is not recirculated. If the two parts, recombined at 90°, are of equal power, then the signal is completely depolarized. The depolarization is limited by the degree of polarization separation achievable by the polarization splitter. If it does not separate the polarizations perfectly, it can not recombine them perfectly, and thus the depolarization will not be perfect. Another restriction on this device is that the state of polarization at the input must be known and must then be aligned properly with the polarization beam splitter so as to split the signal in such a manner that the first part, being equal to the ratio of power split by the polarization beam splitter minus the loss in the polarization beam splitter, is equal to the second part, being the ratio of power split in the second output port minus the loss of the fiber loop minus twice the loss of the polarization beam splitter. The main problem with this device is the loss of the components and the proper handling of polarization maintaining fiber, which will directly affect the efficiency of the depolarizer.

Another depolarizer principle based on birefringent fiber is similar to the use of the polarization beam splitter. As explained in U.S. Pat. Nos. 5,457,756; 5,486,916 and 5,881,185, a birefringent fiber, spliced at 45° with the linearly polarized laser, will split the signal into two parts of equal power. Because of the birefringence, a delay will accumulate between the parts along the fiber. When the delay is larger than the coherence length of the source, the source becomes depolarized and one can splice the birefringent fiber to an ordinary fiber. If one wants to become independent of the state of polarization, one splices two long lengths of polarization maintaining fiber at a 45° angle. The first length creates two distinct incoherent polarization states, but because the input state of polarization is not controlled, these two incoherent states are not necessarily equal in power, which is required to produce a depolarized signal. At the 45° angle splice between the two lengths of polarization maintaining fiber, the two incoherent polarizations are each split in two orthogonal sates of polarization of equal optical power. Each pair of states then propagates in the second length of polarization maintaining fiber and becomes incoherent after an appropriate length. If the two lengths of the polarization maintaining fiber are different, so as not to recreate coherence between the polarization states, the output of the lengths of fiber is composed of four incoherent polarization signals, in which two pairs of signals are of equal power and orthogonal polarization. The signal is then depolarized. Because the delay is obtained only by the birefringence of the fiber, long lengths of fiber are required and only broadband lasers (several nanometers bandwidth) can be depolarized with this method. Moreover, use of several hundreds of meters of birefringent fiber is lossy and bulky; 15 cm of delay lines in a fiber loop is approximately equivalent to 300 meters of delay in a polarization maintaining fiber.

The present invention addresses the problem of efficiency of a recirculating loop depolarizer, the problem of loss and polarization control of the polarization maintaining delay line depolarizer and the coherent length limitation of the birefringent fiber depolarizer as well as making the depolarizer less bulky and more practical to use.

OBJECTS AND SUMMARY OF THE INVENTION

An object of this invention is to provide an all-fiber depolarizer to depolarize light in an optical fiber by splitting the light into two orthogonal polarizations of approximately equal power and delaying one of the polarizations in an optical fiber loop before it is recombined with the other polarization state.

Another object of this invention is to use a polarization splitting coupler to separate the two polarizations and to recombine them thereafter.

A further object of this invention is to control the state of polarization of the signal between a birefringent fiber and a polarization splitter or between two polarization splitters by controlling the length, geometry and angle alignment of the fiber or of the polarization splitters.

A still further object of this invention is to use a standard non-polarization maintaining fiber in the fiber loop. This simplifies the loop and provides low loss.

Yet another object of this invention is to realize a depolarizer independent of the input state of polarization by concatenating two polarization splitters with fiber loops and by adjusting the angle of polarization coming out of the first polarization splitter to be at 45° to the polarization axis of the second polarization splitter. The two fiber loops preferably have different lengths so as not to recreate coherent polarization from one length to another.

Other objects and advantages of the invention will become apparent from the following description thereof.

This invention has two main embodiments. The first is a single stage depolarizer device that depolarizes a signal of linear or circular polarization coming from an optical fiber. This depolarizer is composed of a 2×2 polarization beam splitter where one of the input ports is looped back into the second input port to combine the polarization. The fiber loop is made of standard non-polarization fiber and its length is greater, preferably by several times (ex. 3–5 times) the coherence length of the light source to be depolarized. The second embodiment is a concatenation of two such assemblies to make the depolarizer independent of input polarization state, the first assembly being used to create two signals of incoherent orthogonal state of polarization and the second one to depolarize each of the signals.

In the first embodiment, the present invention uses a polarization beam splitter to create, to separate and to combine orthogonal polarizations. The polarization of the signal entering the polarization beam splitter must either be circular or linear, but at an angle of essentially 45° from the polarization axis of the polarization beam splitter. This causes the signal to be split into two orthogonal, equally powered, optical signals, one in each output port of the polarization beam splitter. The 45° angle can be controlled at the input of the polarization beam splitter with a polarization controller as is well-known in the art or, if the signal input is a polarization maintaining fiber, by splicing this fiber with the input fiber of the polarization beam splitter at 45° angle difference between the birefringence axis of the signal fiber and the polarization axis of the beam splitter. If the input fiber of the polarization beam splitter is not a polarization-maintaining fiber, the splice must be in the component or in a place where the distance between the splice and the internal polarization splitting component is small and the optical fiber is in a straight position. The splice can be further away from the component if the fiber is properly managed or aligned so that the polarization is properly aligned at the input of the polarization maintaining coupler.

The polarization beam splitter may have polarization maintaining PM fibers, but this is not essential for the depolarizer to work. It was surprisingly found that contrary to Japanese Patent No. JP6051243, the loop fiber does not have to be a PM fiber. When the polarization signal is looped back at the second input of the polarization beam splitter, the light is then again split into two polarizations. However, only the state of polarization that is identical to the polarization at the input of the fiber loop will be transferred to the transmission port and that polarization will be orthogonal to the initial polarization that was transmitted from the first input of the polarization splitter to the output transmission port. Using a polarization-maintaining fiber would insure, when properly aligned, that all the power in the loop is thus transferred. However, if a non-polarization maintaining fiber is used, only some power will be transmitted. The rest will be coupled back in the loop, but at 90° polarization rotation with reference to the first time transfer through the loop. The process repeats itself at every loop. However, because of this rotation between the first and second time in the loop, more than 75% of the power is always coupled back in the transmission fiber after just two loops, thus making the recoupling of the recirculation much more efficient than with a non-polarization dependent power splitter. Furthermore, the recombined power is always in the right polarization angle to reduce the degree of polarization, property which is set by the polarization beam splitter. Finally, by using the standard non-polarization maintaining single mode fiber (SM fiber), the loss in the loop, even if there is a splice, can be made very small (less than 0.02 dB). When the polarization beam splitter is an all-fiber based device, such as the ones described in applicant's Canadian Patent Application No. 2,354,903 and Canadian Patent Application filed concurrently herewith on even date, the losses due to the polarization beam combiner are also very small, thus making the loop very efficient. To compensate for this small loss, one could adjust slightly the input angle of 45° to a value that would put a bit more power in the loop (ex. 46°–47° angle) so as to achieve a perfect balance between the two incoherent output polarizations.

The efficiency of this device will be limited in bandwidth by the bandwidth of operation of the polarization beam splitter. If a fused coupler is used (such as described in Canadian Patent Application No. 2,354,903 which is incorporated herein by reference) which has a bandwidth of approximately 8 nm and where the polarization cross talk is smaller than 15 dB, the depolarizer will be efficient over that wavelength range, and will be able to reduce the degree of polarization to better than 3%. If a Mach-Zehnder based polarization beam splitter is used (such as described in Canadian Patent Application filed by the applicant concurrently herewith on even date and incorporated herein by reference), then the bandwidth can be more than 100 nm.

In the second embodiment, two such depolarizers are concatenated to achieve a similar effect as placing two lengths of birefringent fibers is series, spliced at a 45° angle, as described above. The effect achieved is the same, namely such a concatenation is independent of the input signal polarization state, with the difference, however, that this invention will depolarize narrow band lasers because the loops can easily be made longer than the coherence lengths of the lasers as opposed to the impractical birefringent fiber lengths required to do the same. This embodiment of the invention therefore provides a much more universal depolarizer. Because of this universal nature, there are some differences with the single-loop depolarizer. First, this two-stage depolarizer can be entirely built with non-polarization maintaining (SM) fiber. The input fiber of the device can be any fiber, including a non-polarization maintaining SM fiber and the fiber in the loop, as was explained above can also be non-polarization maintaining SM fiber. The state of polarization does not need to be known at the input. This simplifies the fabrication of the polarization beam splitter because no alignment is needed between the input fiber and the polarization axes of the polarization splitter. The polarization axes of the two first incoherent polarizations are defined after the first loop by the polarization axes of the polarization beam splitter. The second stage polarization axes are also defined by the polarization axes of the second polarization beam splitter. When these two pairs of polarization axes are aligned at 45° angle, by controlling the fiber length and geometry and by properly rotating the polarization beam splitters one in respect to the other, the two first incoherent polarization states coming out of the first stage will be each split into two equally-powered incoherent polarization states, thus making the output depolarized. As with the first embodiment, the depolarizer is very efficient when low-loss fiber based polarization beam splitters are used.

In essence, therefore, the all-fiber depolarizer of the present invention comprises In essence, therefore, the all-fiber depolarizer of the present invention comprises (a) a polarization beam splitter having two input fibers and two output fibers and a beam splitting region in-between having a polarizing axis;

(b) control means for controllably injecting polarized light from a light source with a given coherence length into one of the input fibers of the polarization beam splitter so that the polarization of the signal entering the beam splitter is circular or linear at a substantially 45° angle from the polarizing axis of the beam splitter;

(c) a loop formed between the second input fiber and one of the output fibers of the beam splitter, said loop being made of a standard non-birefringent fiber and having a length greater than the coherence length of the light source;

(d) the second output fiber receiving and further transmitting incoherent depolarized light produced by the interaction of the polarization beam splitter and the loop.

The polarization beam splitter is preferably a 2×2 beam splitter adapted to divide light entering through one of its input fibers into two linearly polarized beams that are orthogonal and are defined by the polarizing axis of the beam splitter.

The polarization beam splitter may include as the beam splitting region a fused fiber coupler or it may be a broadband polarization splitter having, for example, an all-fiber Mach-Zehnder structure.

The control means may comprise a birefringent polarization maintaining fiber controllably spliced to one of the input fibers or in lieu thereof may comprise a primary polarization beam splitter having two input fibers and two output fibers, in which one input fiber forms another loop with one output fiber, said loop having a length greater than the coherence length of the light source. This loop preferably has a different length than the loop used with the polarization beam splitter that is concatenated to and follows this primary beam splitter. This arrangement produces a two-stage universal depolarizer.

If fused couplers are used in the beam splitters, the two-stage depolarizer will by narrowband. The alignment of 45° between the two stages is done by properly aligning the plane of the two couplers which define the polarization axes. If Mach-Zehnder structures are used, then only the two birefringent parts of the Mach-Zehnder must be aligned at 45° of each other.

These details will become clearer in the preferred embodiments described below with reference to the appended drawings.

DETAILED DESCRIPTION OF THE INVENTION

The invention will now be described by way of preferred embodiments with reference to the appended drawings, where the same features are designated by the same reference numbers.

Figure 1:
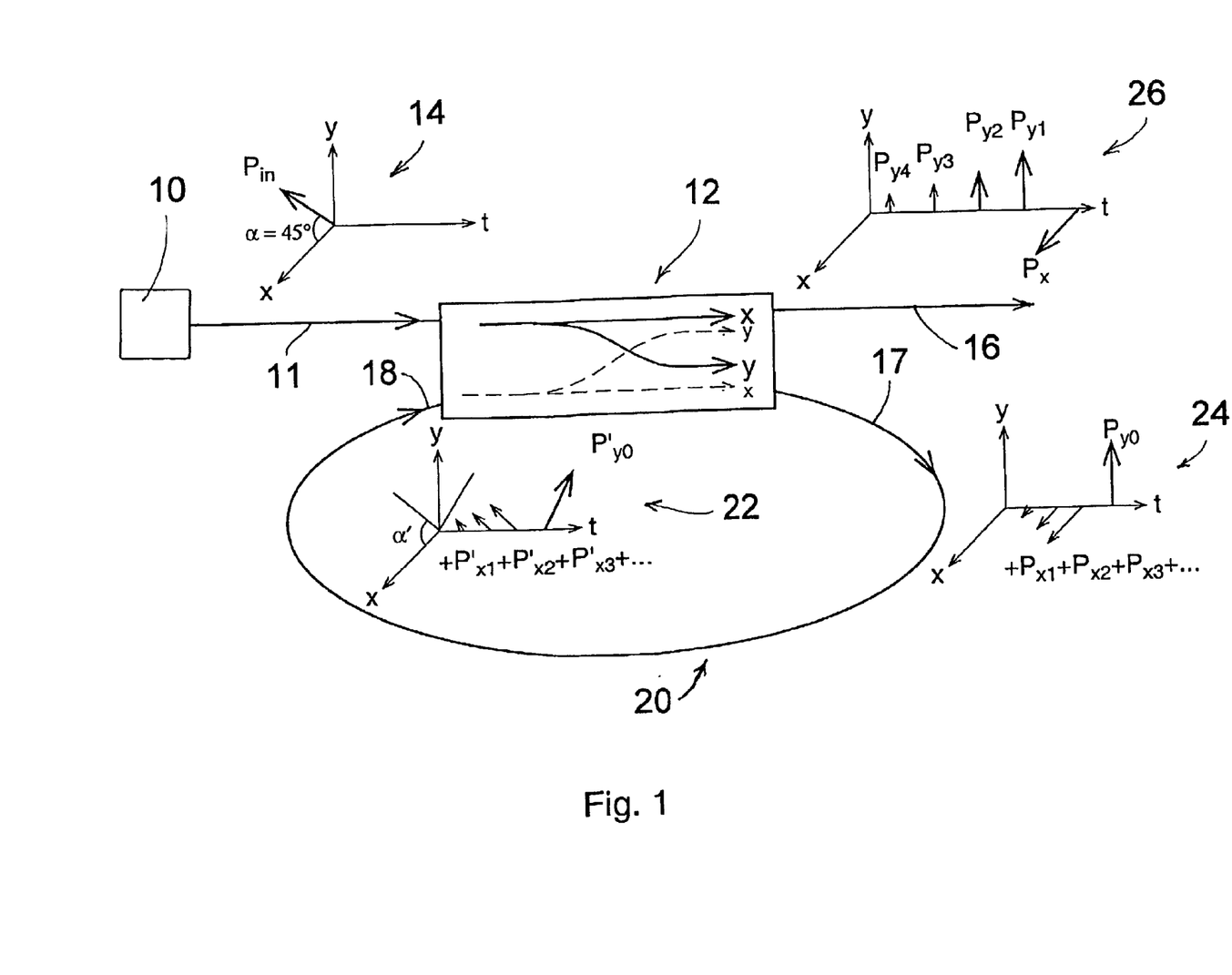
FIG. 1 illustrates a schematic evolution of depolarization through a single stage depolarizer of the present invention.

FIG. 1 illustrates the basic principle of the first embodiment of the present invention. The polarized light, in this case having linear x and y polarizations, is provided by a light source 10 having a given coherence length and is injected in a controlled manner through input port 11 into a polarization beam splitter 12, so as to enter the polarization splitter at essentially 45° of the polarizing axis of the beam splitter. This is shown by the graph 14 of arrows where arrows x and y represent the axes of the polarizations, $P_{in}$ is the power entering the beam splitter 12 and t stands for time. Angle α is controllably adjusted to 45°. The 45° angle can be controlled with a polarization controller; such controllers are well known in the art. It may also be controlled by using at the input, a suitable polarization maintaining (PM) fiber which is a birefringent fiber that would be spliced to the input of the beam splitter 12 at 45° difference between the birefringence axis of the PM fiber and the polarizing axis of the beam splitter 12.

When the polarized light enters the polarization beam splitter 12 as described above, it is split into x and y polarizations as shown by full arrows within the beam splitter 12. The polarization x proceeds to the output port 16 while polarization y is directed to the second output port of the beam splitter 12 shown by arrow 17 which is connected with the second input port of the beam splitter 12 shown by arrow 18 to form a loop 20. Loop 20 through which polarization y is looped back is made of standard non-birefringent single mode (SM) fiber and its length is greater than the coherence length of the light source 10. Polarization y passes through the loop 20 and re-enters the input port of the beam splitter 12 partly as polarization y, and partly as polarization x. Upon re-entry into the beam splitter 12, it is separated into x and y polarizations as shown by the broken line within the beam splitter 12. Polarization y then joins polarization x shown as a solid arrow and leaves the splitter through output port 16. Polarization x shown by dotted arrow within beam splitter 12 goes back into the loop 20 and is recirculated within the loop 20. Such recirculations are shown by the graph 22 of arrows where $P'_{y0}$ is the power of the initial circulation in the loop 20 of polarization y and $P'_{x1}$, $P'_{x2}$ and $P'_{x3}$ are further recirculations of polarization x within the loop 20. The angle α' is not controlled. A similar graph 24 of arrows is shown at the output 17 where entry into the loop 20 takes place at the start of recirculation and as graph 26 of arrows at the output port 16. In all cases, it is a function of t, namely time.

This device is symmetric with respect to the input and output ports. If the light enters the polarization beam splitter by the second input port instead of the first, then light is also split into two orthogonal linearly polarized beams, but the output of the first port is then polarized along the y-axis instead of the x-axis and the light coming out of the second port is polarized along the x-axis instead of the y-axis. Furthermore the polarization beam splitter is bi-directional. Input ports and output ports can be used in reverse direction and the polarization beam splitter can be used to combine two linearly polarized signals. In the example above, if the light in the first input port is polarized along the x-axis and light in the second input port is polarized in the y-axis, then both polarized light signals will be coupled in the first output port into two orthogonal states of polarization.

In the present invention, the polarization beam splitter is used simultaneously as a polarization splitter and a polarization combiner, as shown in FIG. 1. To create the depolarizer, any of the output ports of a 2×2 polarization beam splitter is connected to any of the input ports. This loop is provided to delay in time two polarizations so that they can be coupled back together, but in an incoherent fashion. The fiber loop must be longer than the coherence length (equal to the speed of light divided by the frequency half width) of the light source.

The preferred embodiment of this invention in a single loop device that depolarizes a signal of linear of circular polarization signal coming from an optical fiber. This depolarizer is composed of a 2×2 polarization beam splitter where one of the input ports is looped back into the second input port to combine the polarizations. The fiber loop is made of standard non-polarization fiber and its length is preferably several times the coherence length of the light source to be depolarized.

The polarization of the signal entering the polarization combiner must either be circular or linear, but when linear at an angle of 45° from the polarization axes of the polarization splitter. This causes the signal to be split into two orthogonal equally powered optical signals, one polarized along the x-axis that outputs in the first output port and the second polarized along the y-axis that outputs in the second output port that is looped to the second input port. The 45° angle can be controlled at the input of the polarization beam splitter with a polarization controller well-known in the art or, if the signal input is a polarization maintaining fiber, by splicing this fiber with the input fiber of the polarization beam splitter at 45° angle difference between the birefringence axes of the signal fiber and the polarization beam splitter. Such a state of polarization at the input of the polarization beam splitter causes the light signal to be divided in two beams of equal optical power, one polarized along the x-axis in the first input port and the other polarized along the y-axis going in the loop. The power in the loop is brought back at the second input port of the polarization beam splitter. It goes through the polarization beam splitter and all the portion of the second signal polarized along the y-axis is coupled to the first output port in a state of polarization that is orthogonal to the x-axis polarized signal that is there from the first input. This second signal is also time delayed with respect to the first signal so it is not coherent anymore with the first signal.

Figure 2:
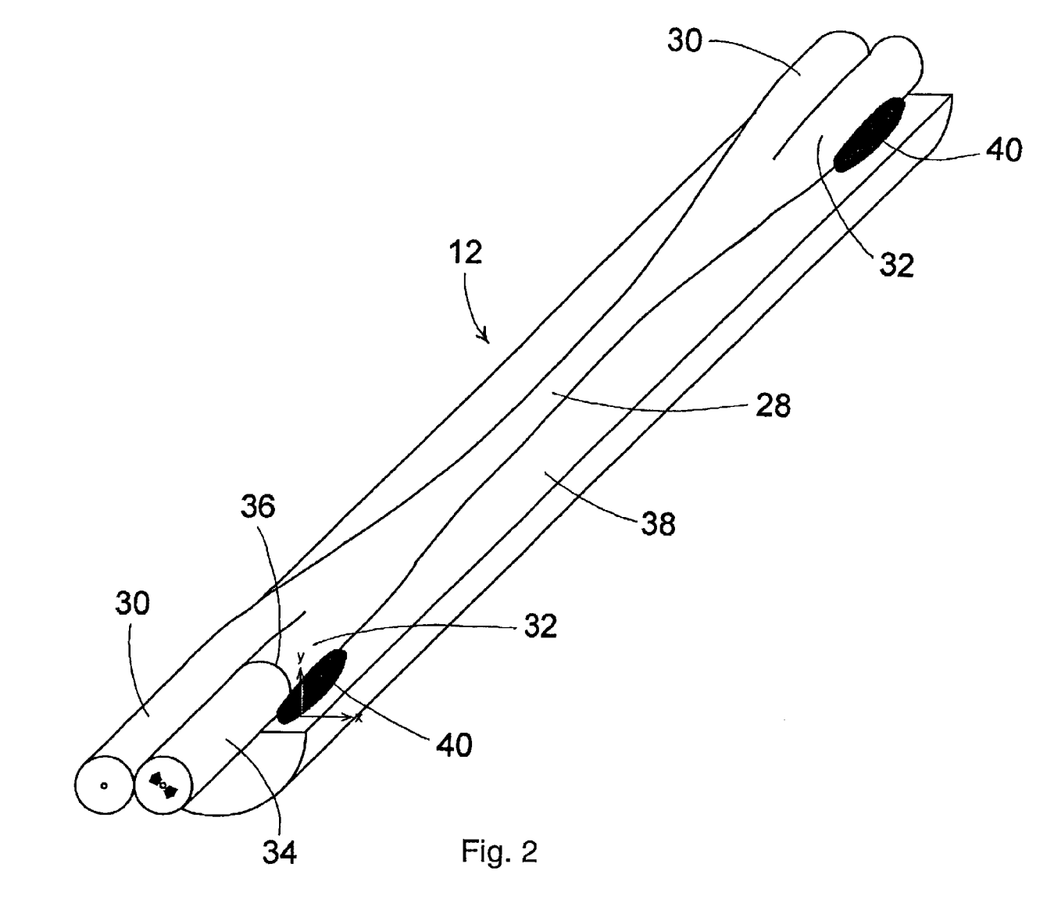
FIG. 2 is a schematic representation of a fused coupler polarization beam splitter with a birefringent fiber spliced to one input fiber of the beam splitter at an angle of 45° from the polarizing axis of the beam splitter.

FIG. 2 illustrates a polarization beam splitter 12 suitable for the present invention. It comprises a coupling area 28 produced by fusing and elongating fibers 30 and 32. At the input end of the beam splitter, a birefringent PM fiber 34 is spliced at 36 to fiber 32 at an angle of 45° difference between the birefringence axis of the fiber 34 and the polarizing axis of the polarization beam splitter 12. In this case, the PM fiber 34 provides the control means needed to input the polarized signal of polarizations x and y into one of the input fibers of the polarization beam splitter 12. The signal is split in the coupling zone 28 into polarizations x and y and polarization x proceeds to the output end of fiber 32 while polarization y proceeds via output end 30 into the recirculation loop 20 as shown in FIG. 1, which connects with the input end of fiber 30. The polarization beam splitter configuration is mounted on substrate 38 to which it is bonded at each end with adhesive 40.

The polarization beam splitter may have polarization maintaining fibers, but this is not essential for the depolarizer to work. When the polarization signal is looped back at the second input of the polarization beam splitter, the light is then again split into two polarizations. However, only the state of polarization that is identical to the polarization at the input of the fiber loop will be transferred to the output transmission port and that polarization will be orthogonal to the initial polarization part that was transmitted from the first input of the polarization beam splitter to the output transmission port. Using a polarization maintaining fiber would insure, when properly aligned, that all the power in the loop is thus transferred. However, if a non-polarization fiber is used, only some power will be transmitted. The rest will be coupled back in the loop, but at 90° polarization rotation with reference to the first time passage through the loop. The process repeats itself at every loop. However, because of this rotation between the first and second time in the loop, more than 75% of the power is always coupled back in the transmission fiber after just two loops, thus making the recoupling of the recirculation much more efficient than with a non-polarization dependent power splitter. Furthermore, the recombined power is always in the right polarization angle to reduce the degree of polarization, property which is set by the polarization beam splitter, and the added signals are always incoherent with all the other signals travelling in the fiber. Finally, by using the standard non-polarization fiber, the loss in the loop, even if there is a splice, can be made very small (less than 0.02 dB). To compensate for this small loss, one could adjust slightly the input angle of 45° to a value that would put a bit more power in the loop so as to achieve a perfect balance between the two incoherent output polarizations. This deviation from an angle of 45° can be calculated in advance, prior to splicing and bonding of the input fiber to the substrate holding the component.

Figure 3:
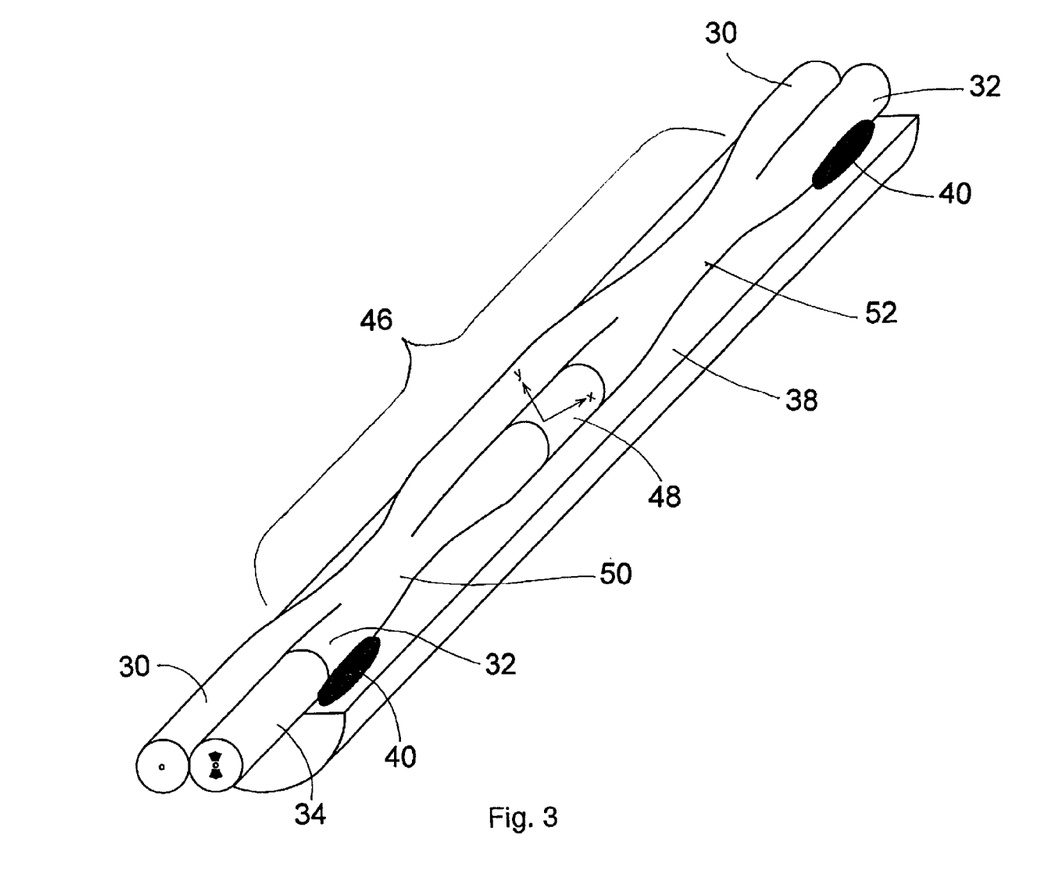
FIG. 3 is a schematic representation of a Mach-Zehnder based, broadband polarization beam splitter that may be used in lieu of the coupler shown in FIG. 2.

FIG. 3 illustrates a further embodiment of the present invention in which a Mach-Zehnder structure 46 is used as a broadband polarization beam splitter. Here, the Mach-Zehnder effect is produced by inserting in one of the arms between couplers 50 and 52 of the Mach-Zehnder device a segment 48 of a birefringent fiber. This allows to adjust both the optical length and the polarizations entering the second coupler 52 of the Mach-Zehnder. In this case, only the two birefringent parts 34 and 48 must be aligned at 45° of each other. The remainder structure is essentially as has been described with reference to FIG. 2.

Figures 4A, 4B:
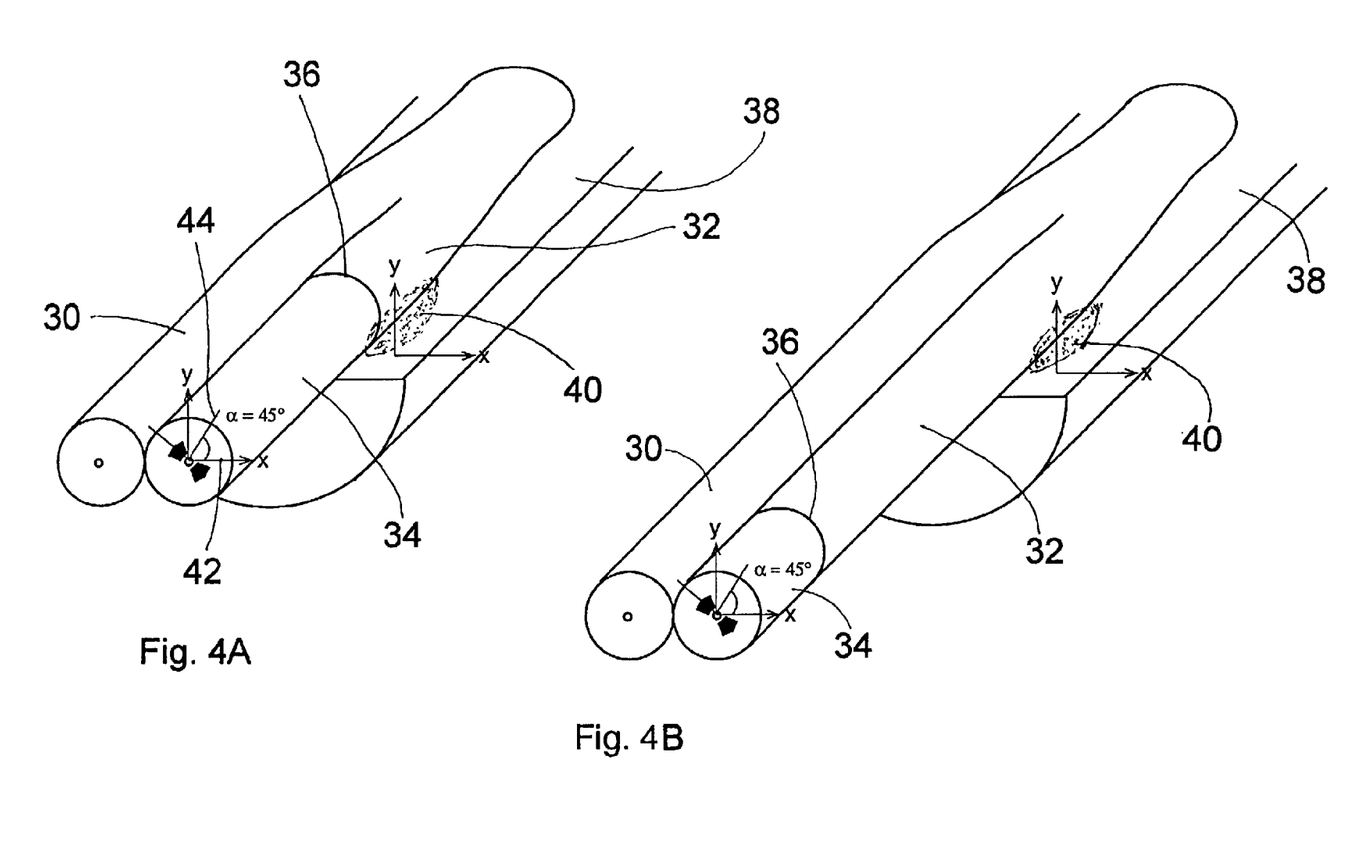
FIG. 4A is an enlarged representation of the birefringent fiber spliced to one input fiber of the beam splitter at 45° from the polarizing axis of the beam splitter, with the splice being fixed to the substrate on which the beam splitter is mounted.
FIG. 4B is an enlarged representation of the birefringent fiber spliced to one input fiber of the beam splitter at 45° from the plane of the coupler, with the splice being outside of the substrate to allow tuning of the angle of input polarization.

FIG. 4A illustrates an enlarged view of one embodiment of the input end of the polarization beam splitter 12 shown in FIG. 2 or of a Mach-Zehnder shown in FIG. 3. In this embodiment, the end of the PM fiber 34 is spliced to input fiber 32 in a controlled manner, so that angle α between birefringence axis 42 and the axis 44 of the beam splitter is equal to 45°. The area where the splicing 36 is made is bonded to the substrate 38 with adhesive 40 to keep it in the predetermined position. The coupler polarization splitting axes are defined by the two fiber planes and thus if they are bonded parallel to the substrate, they also become defined with reference to the substrate plane. In the case of the Mach-Zehnder structure, illustrated in FIG. 3, the plane is defined by the axis of the birefringent fiber inserted in the phase shifting section of the Mach-Zehnder interferometer between the two couplers. To bond this splice to the substrate holding the polarization splitter, one must make the splice prior to the fabrication of the component.

FIG. 4B illustrates an enlarged view of another embodiment of the input end of the polarization beam splitter 12 shown in FIG. 2 or of a Mach-Zehnder shown in FIG. 3. In this case, the structure is essentially the same as in FIG. 4A, but the splice 36 between fiber 32 and PM fiber 34 is made outside of the substrate 38. This allows some control of the angle of polarization of the input signal by permitting the rotation of the splice and by bonding it after the fabrication and bonding of the beam splitter.

Figure 5:
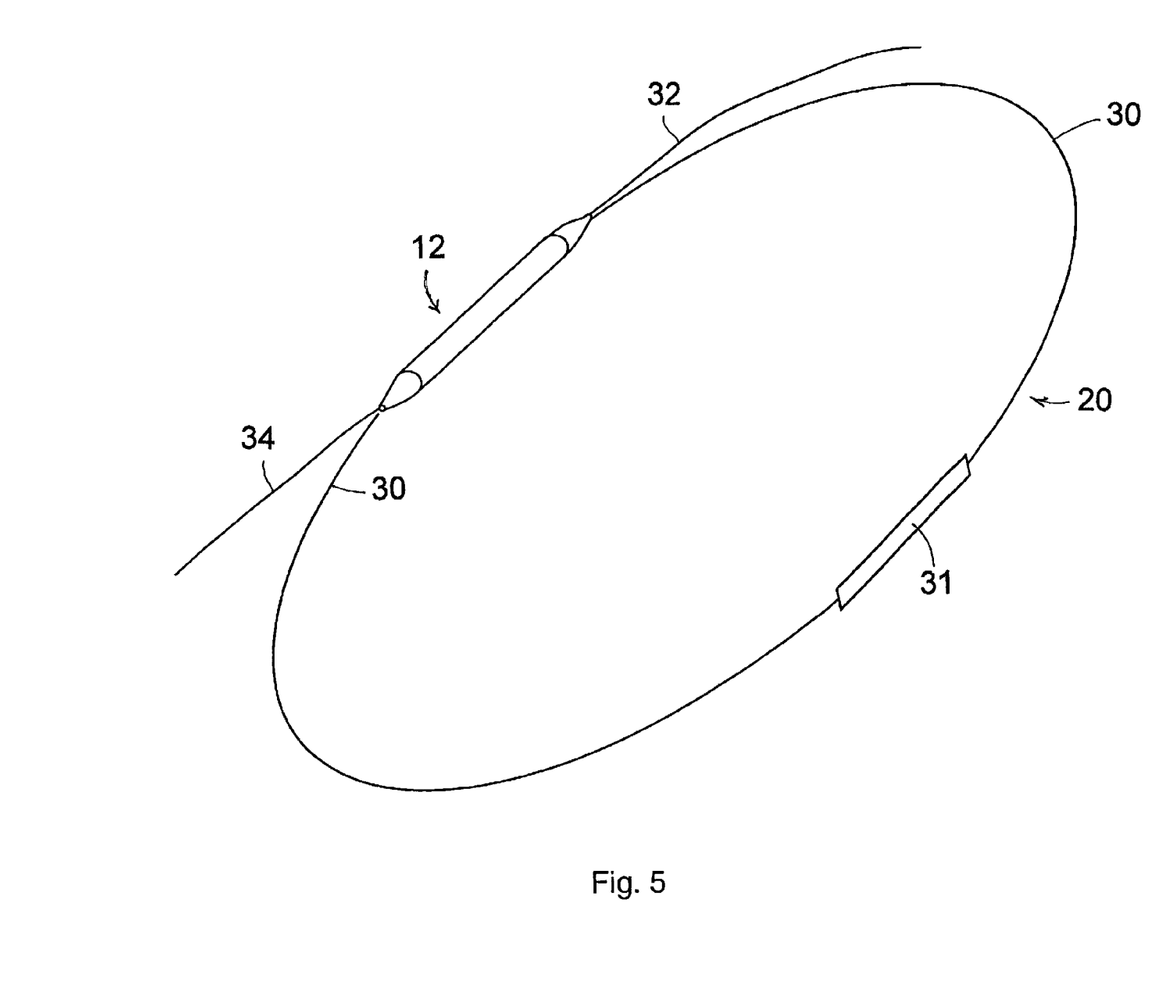
FIG. 5 is a representation of a single stage depolarizer according to the present invention showing a packaged polarization beam splitter of which one input fiber is spliced to one output fiber to form a fiber loop.

FIG. 5 illustrates one embodiment of a packaged depolarizer in accordance with the present invention. Here, the polarized light enters the polarization beam splitter 12 via PM fiber 34 at 45° angle. The beam splitter 12 is normally packaged in a protective tube. Fiber 34 is spliced with the inlet end of fiber 32 inside the packaging of the beam splitter 12. The incoherent signal exits via output end of fiber 32. One of the polarizations exits the beam splitter 12 via the output end of fiber 30 and passes through the loop which is spliced at 31 with the input end of fiber 30 so that the polarization which travels in the loop 20 and re-enters the beam-splitter 12 where it joins the polarization exiting by output end of fiber 32. The fiber of the loop 20 is a standard single mode SM fiber. This allows to make the loss in the loop 20 very small, normally less than 0.02 dB.

Figure 6:
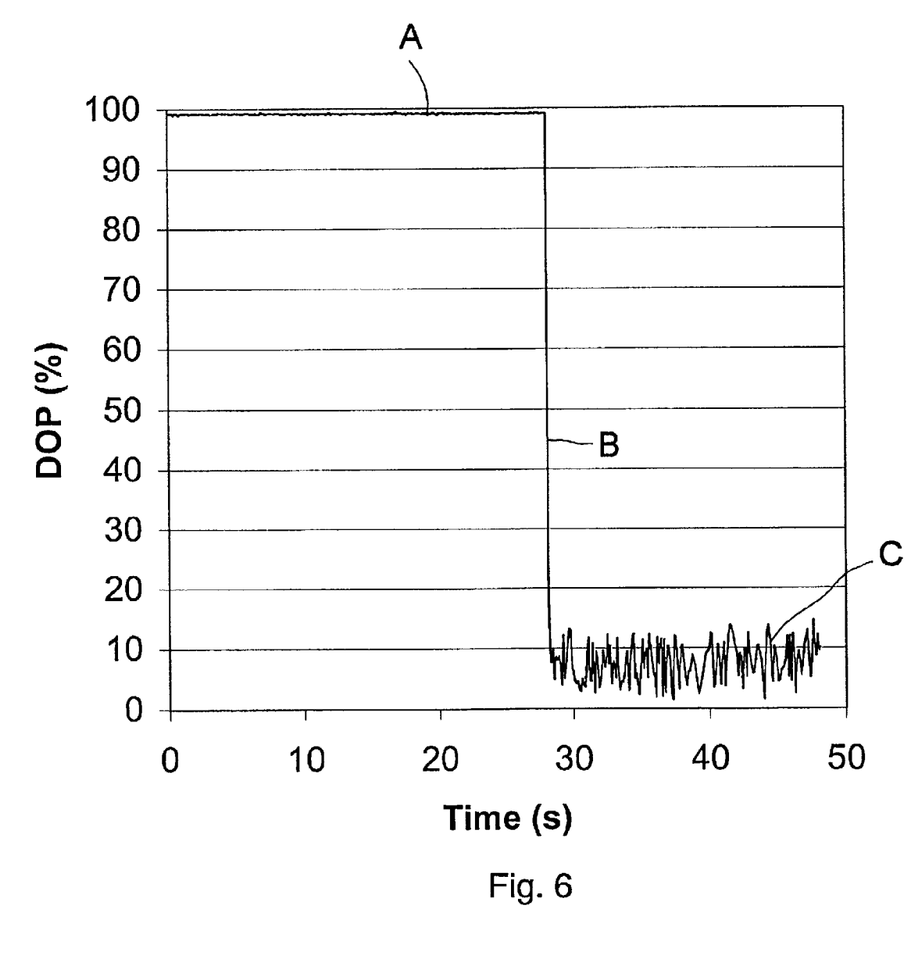
FIG. 6 is a graph illustrating the degree of polarization (DOP) of a laser diode passing through the beam splitter, before and after splicing the fiber in the loop as shown in FIG. 5.
Figure 7:
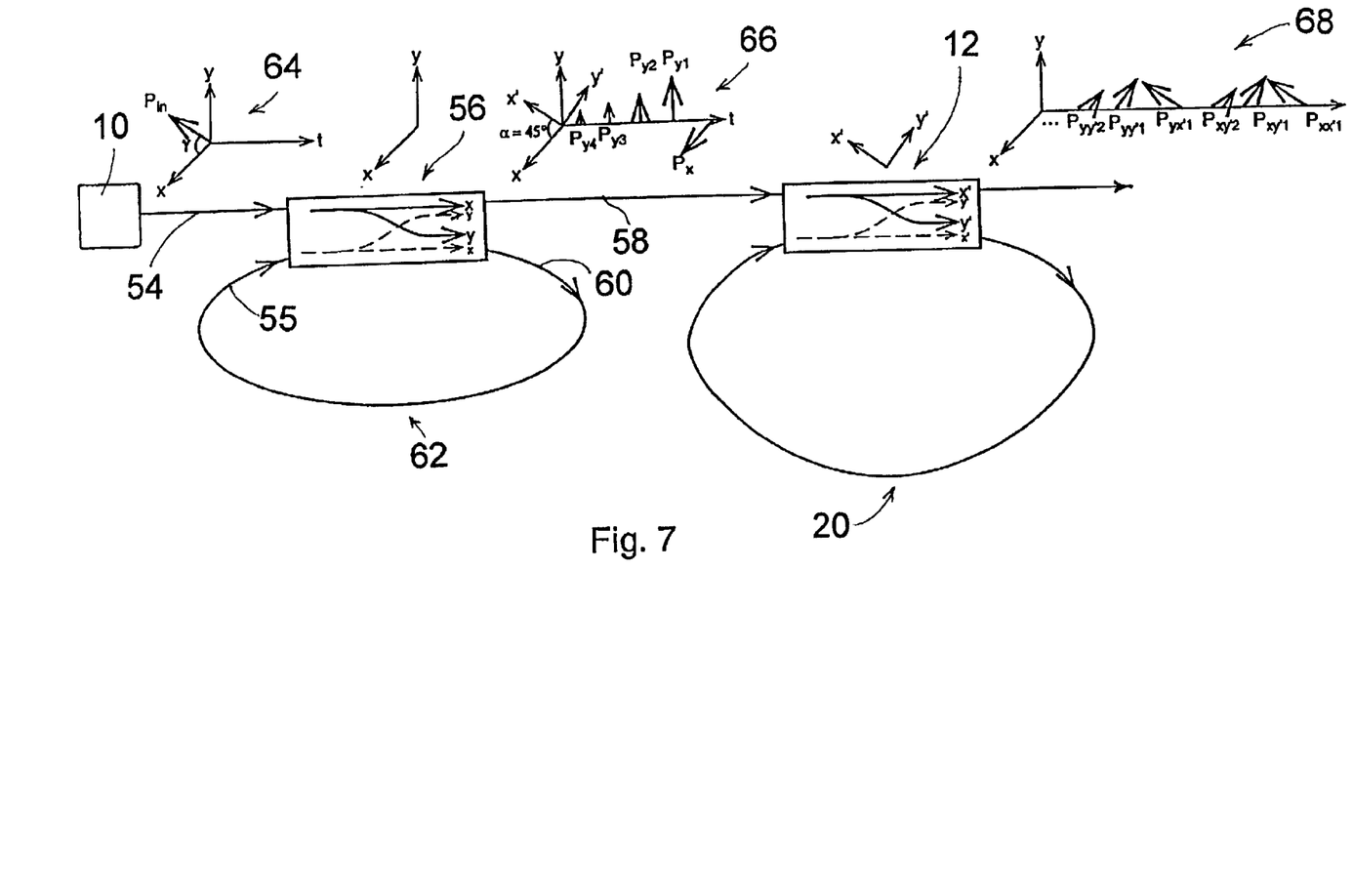
FIG. 7 illustrates a schematic evolution of the polarization states through a dual stage, universal depolarizer of the present invention.

FIG. 6 illustrates the drop in the degree of polarization (DOP) of a laser diode passing through the depolarizer of the present invention. Line A represents the polarized light passing prior to splicing the loop 20 at 31 and has a DOP close to 99%. Line B represents the drop achieved after provision of the loop 20 and line C represents the incoherent depolarized light resulting after depolarization with a depolarizer shown in FIG. 5. In this single loop structure, the efficiency of the depolarizer depends on the input state of polarization. It thus works well when the input signal is pigtailed with a polarization maintaining fiber and that the signals in this fiber are aligned with the polarization axis of the fiber. The depolarizer can depolarize several signals at the same time, provided that those signals are each of them aligned with one polarization axis of the polarization maintaining fiber and that they are all incoherent with each other. However, in some cases, the signals will not be in such states of polarization. Thus, in a further embodiment, this invention describes a depolarizer which is independent of the input states of polarization FIG. 7 illustrates the further embodiment of the invention which gives a schematic evolution of the polarization state through a dual stage, universal depolarizer. In this embodiment, rather than using a birefringent fiber spliced at 45° to the input fiber of a polarization beam splitter, one may use a standard SM input fiber 54 to inject polarized light into a first polarization beam splitter 56 which has an output fiber 58 and whose second output fiber 60 forms a loop 62 with the second input fiber 55 leading to the beam splitter 56. The loop 52 is made of standard non-birefringent single mode SM fiber and has a length greater than the coherence length of the light source 10 to be depolarized, such as a laser.

This primary set-up is used to align the light to be depolarized so that it would penetrate the second polarization beam splitter 12 at a 45° angle. This is illustrated by the graph 64 of arrows which shows the polarized light with polarizations x and y, as it penetrates into the first polarization beam splitter 56 via an SM fiber 54, and by the graph 66 of arrows which shows the alignment of the transformed polarizations at the appropriate angle of 45°. Thus, the primary set-up consisting of polarization beam splitter 56 and loop 62 represents the control means by which the angle at the input to the second polarization beam splitter 12 (which is identical to the one shown in FIG. 1) is adjusted to 45° without using a PM fiber spliced to the input fiber of the beam splitter 12. The properly aligned polarized light is then depolarized by the set-up of beam splitter 12 and loop 20 as described above with reference to FIG. 1 and other figures and exits in a depolarized state illustrated by the graph 68 of arrows.

Figure 8:
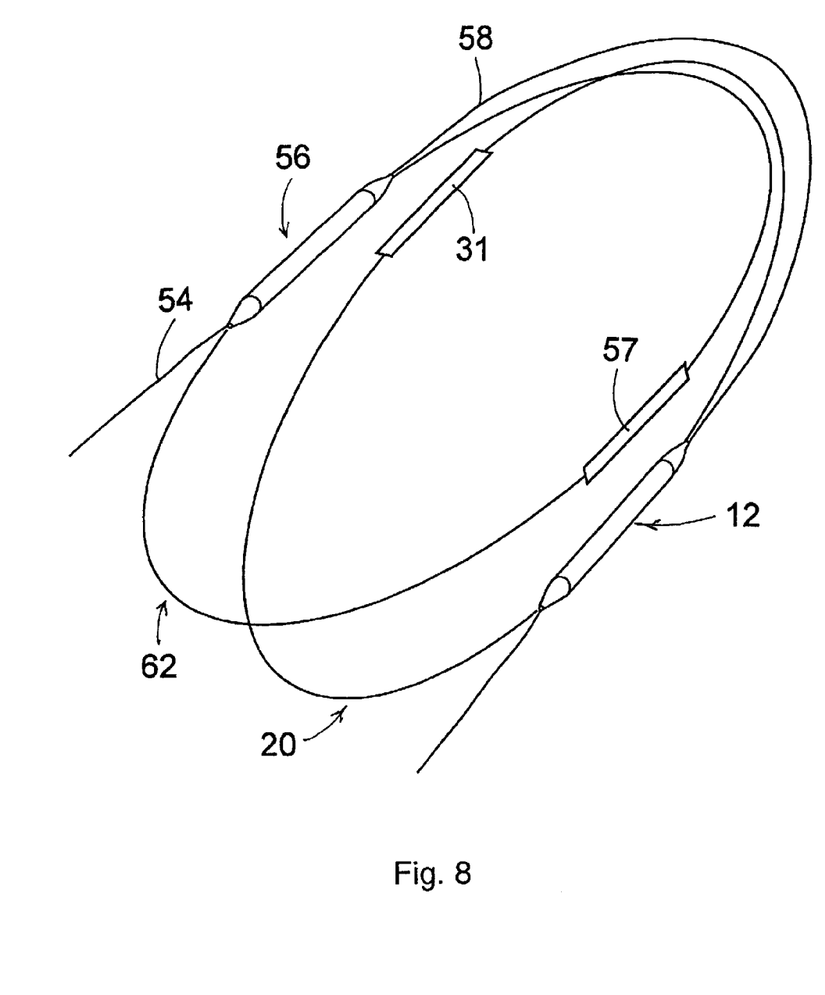
FIG. 8 is a representation of a universal depolarizer of the present invention having two packaged beam splitters each having a loop and being concatenated in series.

FIG. 8 shows an assembly of the universal depolarizer described with reference to FIG. 7. It is called "universal" because polarized light, in this case, can be injected into the first polarization beam splitter 56 through any type of fiber 54, including a standard SM fiber, without requirement of any alignment of the light signal. It is therefore independent of the state of polarization of the input signal. The beam splitter 56 is combined with the loop 62 made of standard SM fiber spliced at 57 and this primary set-up is used to align the input signal to the polarization beam splitter 12 at the required angle of 45°. Beam splitter 12 is combined with loop 20 produced by splicing at 31 on input and one output fiber of the beam splitter as already previously described with reference to FIG. 5. Such depolarizer can depolarize narrow band lasers because the loops 62 and 20 can easily be made longer than the coherence lengths of the lasers as opposed to the impractical birefringent fiber lengths required to do the same.

Figure 9:
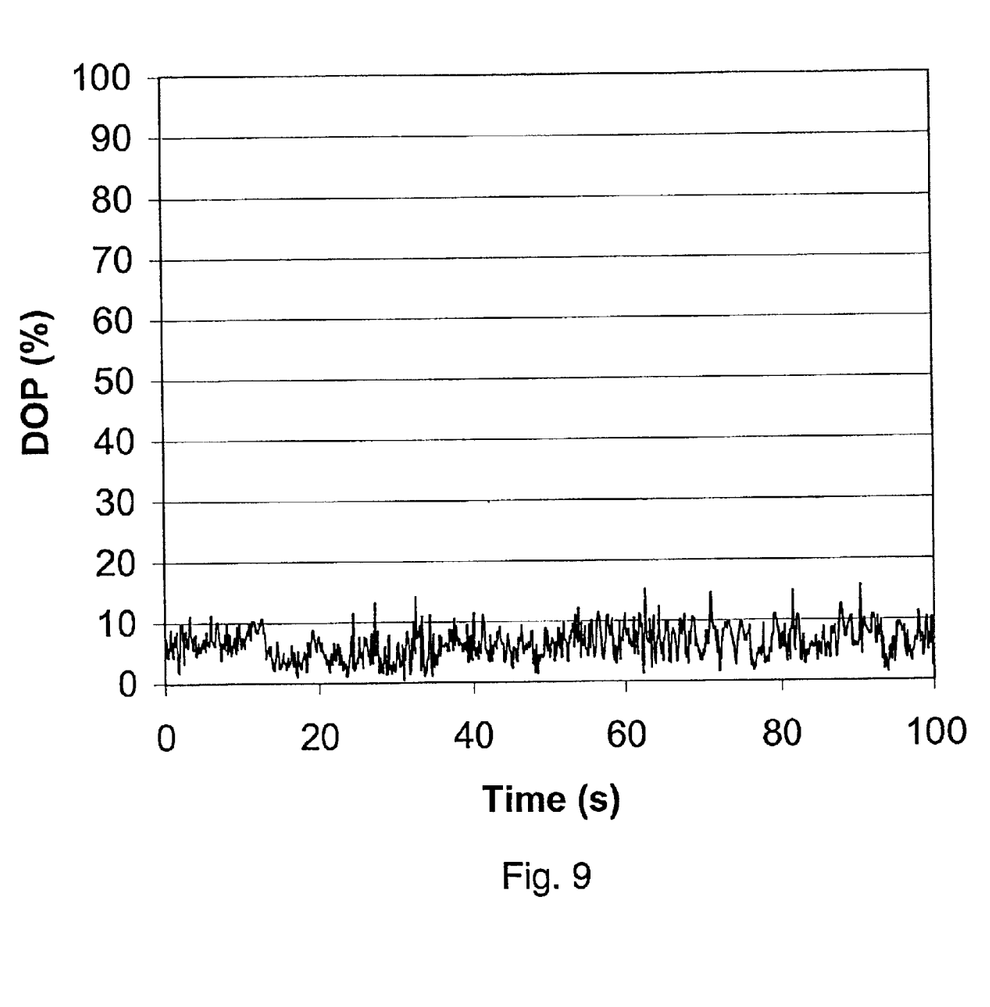
FIG. 9 is a graph illustrating the degree of polarization (DOP) of a light source, as a function of time, when the input polarization to the depolarizer is randomly varied.

Finally, FIG. 9 shows an actual experimental result of degree of polarization (DOP) produced by a light source as a function of time when the input polarization to the depolarizer of the present invention is randomly varied. The graph illustrates the DOP coming out of the output transmission port.

The invention is not limited to the specific embodiments described above and many modifications obvious to those skilled in the art can be made therein without departing from the concept and features of the invention as claimed.

What is claimed is:

1. An all-fiber depolarizer comprising:
   (a) a polarization beam splitter having two input fibers and two output fibers and a beam splitting region in-between having a polarizing axis;
   (b) control means for controllably injecting polarized light from a light source with a given coherence length into one of the input fibers of the polarization beam splitter so that the polarization of the signal entering the beam splitter is circular or linear at a substantially 45° angle from the polarizing axis of the beam splitter, which causes the signal to be split into two orthogonal, equally powered, optical signals, one in each output fiber of the polarization beam splitter;
   (c) a loop formed between the second input fiber and one of the output fibers of the beam splitter, said loop being made of a standard non-birefringent fiber and having a length greater than the coherence length of the light source;
   (d) the second output fiber receiving and further transmitting incoherent depolarized light produced by the interaction of the polarization beam splitter and the loop.

2. An all-fiber depolarizer according to claim 1, in which the polarization beam splitter is a 2×2 beam splitter adapted to divide light entering through one of its input fibers into two linearly polarized beams that are orthogonal and are defined by the polarizing axis of the beam splitter.

3. An all-fiber depolarizer according to claim 1, in which the beam splitting region of the polarization beam splitter is a fused fiber coupler.

4. An all-fiber depolarizer according to claim 1, in which the polarization beam splitter is a broadband polarization splitter.

5. An all-fiber depolarizer according to claim 4, in which the broadband polarization splitter has an all-fiber Mach-Zehnder structure.

6. An all-fiber depolarizer according to claim 1, in which the control means comprise a birefringent polarization maintaining fiber controllably spliced to one of the input fibers.

7. An all-fiber depolarizer according to claim 1, in which the polarization beam splitter is mounted on a suitable substrate to form a unitary structure.

8. An all-fiber depolarizer according to claim 1, in which the control means comprise a birefringent polarization maintaining fiber spliced at an angle of 45° from the polarizing axis of the beam splitter to one of the input fibers of the beam splitter, said beam splitter, including the splicing with the birefringent polarization maintaining fiber, are bonded to a suitable substrate to form a unitary structure.

9. An all-fiber depolarizer according to claim 1, in which the control means comprise a birefringent polarization maintaining fiber spliced at an angle of 45° from the polarizing axis of the beam splitter to one of the input fibers of the beam splitter, said splicing being done outside of a substrata to which the beam splitter is bonded.

10. An all-fiber depolarizer according to claim 1, in which the length of the loop is several times the coherence length of the light source.

11. An all-fiber depolarizer according to claim 1, in which the control means comprise a primary polarization beam splitter having two input fibers and two output fibers, in which one input fiber forms another loop with one output fiber, said loop having a length greater than the coherence length of the light source.

12. An all-fiber depolarizer according to claim 11, in which the loop used with the primary polarization beam splitter is of different length than the loop used with the polarization beam splitter into which light is controllably injected and which is concatenated to and follows the primary beam splitter.

13. An all-fiber depolarizer according to claim 1, which is bi-directional and becomes a polarization combiner of two linearly polarized signals when used in reverse direction.

* * * * *